US010610030B1

(12) United States Patent
Banner

(10) Patent No.: US 10,610,030 B1
(45) Date of Patent: Apr. 7, 2020

(54) ARTISTIC CONSTRUCT DISPLAY SYSTEM

(71) Applicant: Noble Banner, Safford, VA (US)

(72) Inventor: Noble Banner, Safford, VA (US)

( * ) Notice: Subject to any disclaimer, the term of this patent is extended or adjusted under 35 U.S.C. 154(b) by 0 days.

(21) Appl. No.: 16/251,225

(22) Filed: Jan. 18, 2019

Related U.S. Application Data

(63) Continuation-in-part of application No. 15/348,116, filed on Nov. 10, 2016, now abandoned.

(51) Int. Cl.

| | |
|---|---|
| ***G02B 27/02*** | (2006.01) |
| ***A47F 3/00*** | (2006.01) |
| ***A47F 3/11*** | (2006.01) |
| ***F21V 9/32*** | (2018.01) |
| *B65D 6/04* | (2006.01) |
| *A47F 11/10* | (2006.01) |

(52) U.S. Cl.
CPC .............. *A47F 3/001* (2013.01); *A47F 3/004* (2013.01); *A47F 3/11* (2013.01); *F21V 9/32* (2018.02)

(58) Field of Classification Search
CPC .......... A47F 11/10; A47F 3/145; A47F 3/125; A47F 3/06; A47F 3/10; F21V 9/30
See application file for complete search history.

(56) References Cited

U.S. PATENT DOCUMENTS 1,850,319 A * 3/1932 Fensom .................. G09F 13/26 362/812
4,015,353 A * 4/1977 Zarfati .................... G09F 11/02 40/502
5,555,654 A * 9/1996 Hermann ............ G09F 13/0413 362/604
6,018,899 A * 2/2000 Hanitz .................... G09F 13/02 40/431
6,298,588 B1 * 10/2001 Remitz ..................... G09F 9/33 345/31
6,676,276 B2 * 1/2004 Stephens ................ G09F 19/02 362/260
6,732,462 B1 * 5/2004 Kramer ................... A47F 3/005 312/114
6,735,022 B1 * 5/2004 Solitt ........................ A47F 7/02 206/566
7,001,038 B2 * 2/2006 Bock ...................... G01N 21/87 362/125
7,146,760 B2 * 12/2006 Yiu ......................... A47F 3/001 40/743
8,904,682 B1 * 12/2014 Lavilla .................... G09F 19/02 40/431
8,928,682 B2 * 1/2015 Bell ....................... G09G 3/003 345/589
2002/0126396 A1 * 9/2002 Dolgoff .............. G02B 27/2278 359/743
2008/0169735 A1 * 7/2008 Yamazaki ............... A47F 3/001 312/114
2011/0204129 A1 * 8/2011 Conroy .................. B65D 5/248 229/126
2013/0083515 A1 * 4/2013 Wung .................. F21V 29/006 362/184

* cited by examiner

*Primary Examiner* — Tracie Y Green
(74) *Attorney, Agent, or Firm* — Peter J. Van Bergen

(57) ABSTRACT

An artistic construct display system includes an opaque housing having an opening. The housing has matte black inside wall surfaces. Fluorescent element(s) mounted on the matte black inside wall surfaces are illuminated by at least one ultraviolet (UV) light mounted in the housing adjacent to the opening such that each UV light is not viewable through the opening.

7 Claims, 9 Drawing Sheets

ARTISTIC CONSTRUCT DISPLAY SYSTEM

CROSS-REFERENCE TO RELATED APPLICATION(S)

This is a continuation-in-part application of pending application Ser. No. 15/348,116, entitled "ARTISTIC CONSTRUCT DISPLAY SYSTEM", filed on Nov. 10, 2016, and which is incorporated herein by reference in its entirety.

FIELD OF THE INVENTION

The invention relates generally to display systems, and more particularly to an internally-lit enclosure that supports the arrangement and display of an artistic construct.

BACKGROUND OF THE INVENTION

Two-dimensional artworks are typically arranged on and applied to a variety of planar substrate surfaces (e.g., paper, canvas, wood boards, metal sheets, etc.). Such planar substrate surfaces are readily available from a variety of commercial sources. Three-dimensional artworks are typically built or constructed "from scratch" as a variety of materials, shapes, structures, etc., are generally formed, arranged, and/or assembled into a desired form/shape without the use of a commercially-available substrate. That is, there is generally no commercially-available "canvas" to serve as the base building block for three-dimensional artworks.

SUMMARY OF THE INVENTION

Accordingly, it is an object of the present invention to provide an apparatus that supports the arrangement and display of elements that are to form an artistic construct.

Other objects and advantages of the present invention will become more obvious hereinafter in the specification and drawings.

In accordance with the present invention, an artistic construct display system includes an opaque housing having an opening. The housing has matte black inside wall surfaces. At least one fluorescent element is mounted on the matte black inside wall surfaces. At least one ultraviolet (UV) light is mounted in the housing adjacent to the opening such that each such UV light is not viewable through the opening from outside of the housing.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
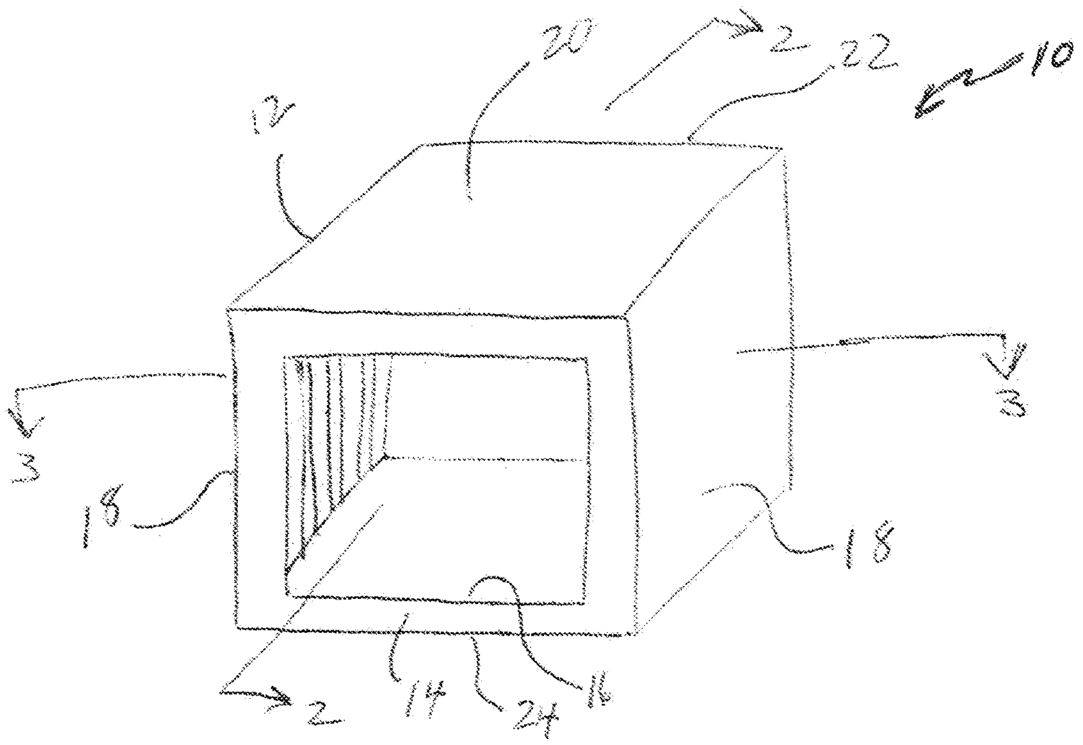
FIG. 1 is a perspective view of an internally-lit enclosure for the arranging and displaying of an artistic construct in accordance with an embodiment of the present invention.
Figure 2:
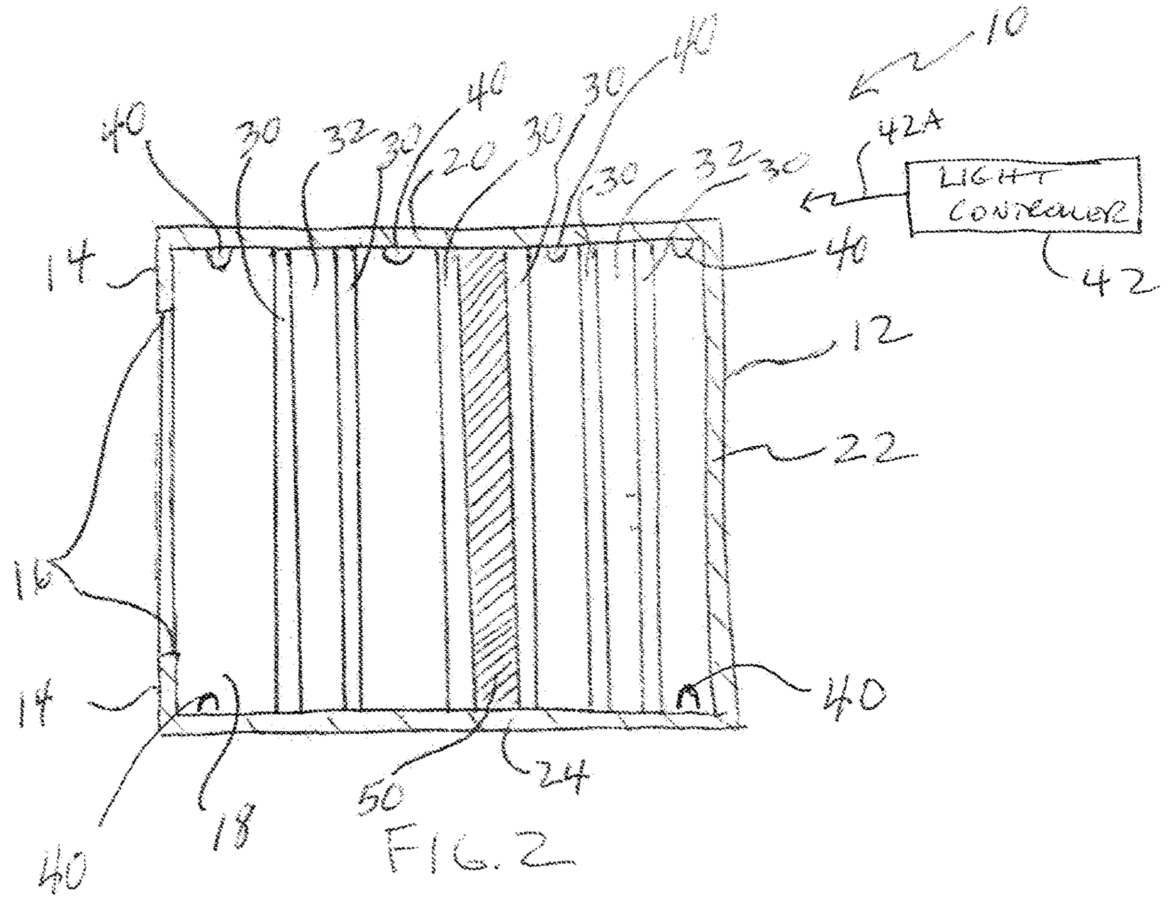
FIG. 2 is a side-to-side cross-sectional view of the enclosure taken along line 2-2 in FIG. 1.
Figure 3:
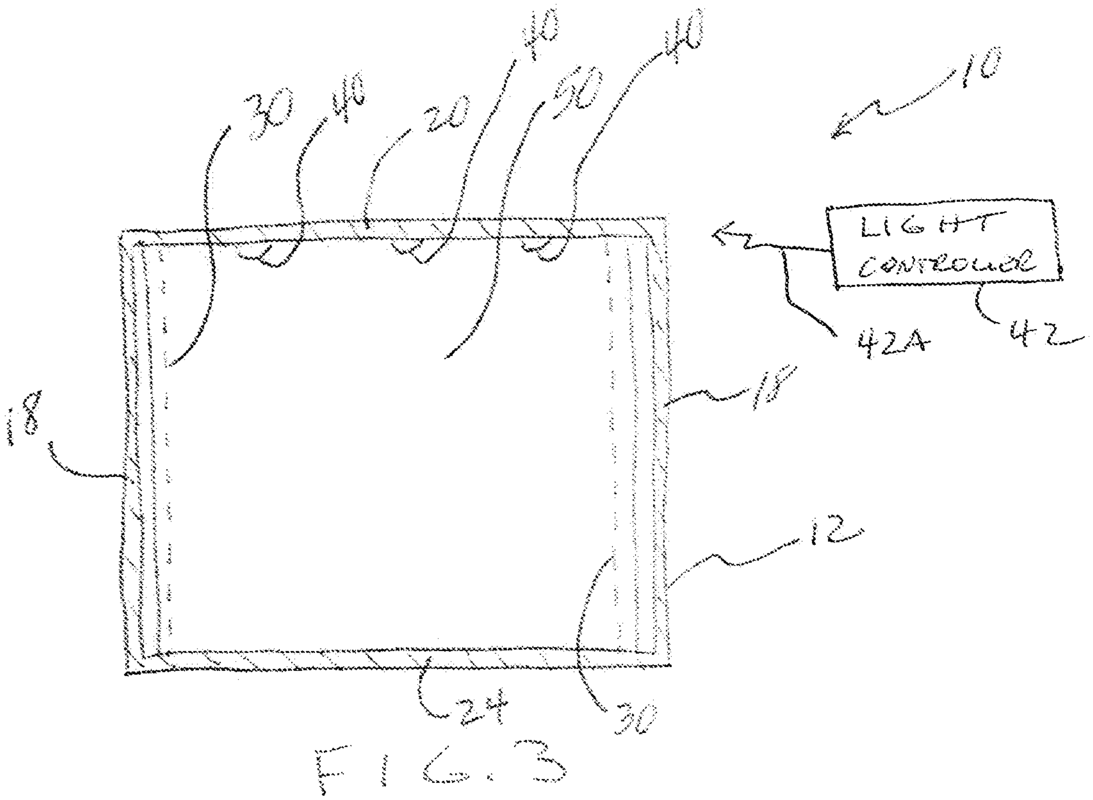
FIG. 3 is a front-to-back cross-sectional view of the enclosure taken along line 3-3 in FIG. 1.
Figure 4:
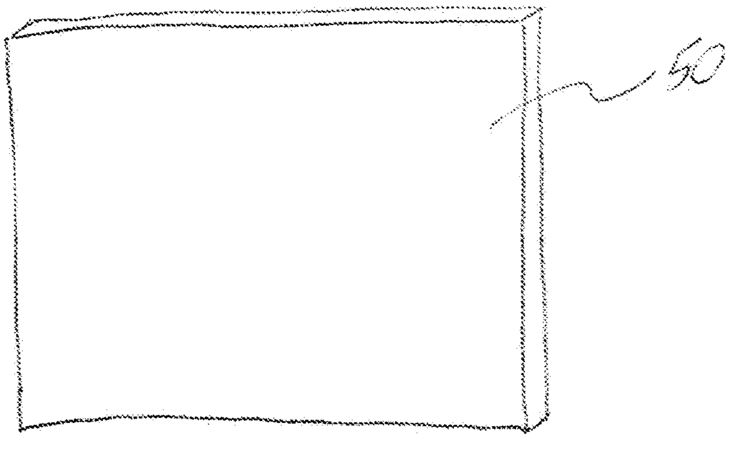
FIG. 4 is an isolated perspective view of a transparent mounting sheet.

Referring now to the drawings, simultaneous reference will be made to FIGS. 1-4 in order to explain an embodiment the present invention's internally-lit enclosure for the arranging and displaying of an artistic construct. FIGS. 1-3 illustrate various views of an enclosure 10 in its entirety, and FIG. 4 illustrates a single transparent mounting sheet 50 that is installed in the enclosure as will be explained further below. In the illustrated embodiment, the enclosure is a cube-shaped enclosure. However, it is to be understood the three-dimensional shape of the enclosure can other than a cube (e.g., any rectangular box shape, triangular enclosure, irregularly-shaped enclosure, etc.) without departing from the scope of the present invention. Furthermore, the size of the enclosure is not a limitation of the present invention.

As will be explained below, enclosure 10 defines an artistic construct display system for one or more artistic elements. The particular types of artistic elements and the arrangement of the artistic elements can be varied without departing from the scope of the present invention. Indeed, one of the advantages of the present invention is that it can serve as a base or generic "canvas" on which a user arranges artistic elements of choice in a desired arrangement to produce a desired effect. Such artistic elements can include, but are not limited to, pre-fabricated geometric shapes, characters, actual objects, likenesses of actual objects, original or hand-made works, and/or combinations thereof. The enclosure can be used for any amateur or professional artistic purpose without departing from the scope of the present invention.

Enclosure 10 includes an outer rigid and generally hollow housing 12 that can be made from wood, plastic, metal, etc., without departing from the scope of the present invention. All sides but one of housing 12 are completely opaque. In the illustrated embodiment, the sides 18, top 20, back 22, and bottom 24 of housing 12 are completely opaque, while one side 14 of housing 12 includes a see-through opening 16 that can be an unobstructed pass-through opening or can have a transparent sheet of material such as clear glass, plastic, 3-D glass, etc., disposed across opening 16. The particular construction details associated with housing 12 are not limitations of the present invention.

Disposed at opposing vertical locations within housing 12 are rails 30 that define opposing vertical slots 32 along sides 18. Each opposing pair of rails/slots 30/32 provides support for one transparent mounting sheet 50 (e.g., sheet of plastic, glass, etc.). For example, in the illustrated embodiment, three sets of rails/slots 30/32 are distributed along the inside of housing 12 (e.g., on opposing inside faces of sides 18) with a single transparent sheet 50 being supported in the middle one of rails/slots as illustrated in FIG. 2. The shape of sheet 50 can mimic the cross-sectional shape of housing 12, but sheet 50 is not limited to such shaping. It is to be understood that more or fewer of sets of rails/slots 30/32 can be provided, and that more than one sheet 50 can be used simultaneously in enclosure 10 without departing from the scope of the present invention. In the illustrated embodiment, rails/slots 30/32 are arranged such that multiple sheets 50 can be disposed and supported by housing 12 in a spaced-apart parallel relationship to one another and to side 14 with see-through opening 16. To simplify access to slots/rails 30/32, one or more of sides 18, top 20 and bottom 24 can be a removable/attachable part of housing 12 to facilitate insertion/removal of sheet(s) 50.

Mounted within housing are one or more lights 40 that can include, for example, fluorescent bulbs, LEDs, ultraviolet (UV) black lights, etc., and combinations thereof, without departing from the scope of the present invention. Light(s) 40 can be positioned in permanent or variable locations within housing 12. For example, in the illustrated embodiment, multiple lights 40 are placed fore and aft each of the sets of rails/slots 30/32 thereby making it possible to provide light immediately in front of and behind any installed sheet 50. A light controller 42 (shown only in FIGS. 2 and 3) can be provided on housing 12 or in a remote control unit to control selective activation of lights 40 (e.g., a particular on/off arrangement of the lights, a random or periodic sequence of on/off instructions for the lights, strobing, et al.) of lights 40 to achieve a desired effect. For example, in the illustrated embodiment, light controller 42 can transmit wireless control signals 42A to control lights 40 in ways well understood in the art. An on/off sequencing or strobing of lights 40 could also by synchronized with an audio program (e.g., music, narration, etc.). Additional lights (not shown) could also be positioned on the outside of housing 12 without departing from the scope of the present invention.

As mentioned above, transparent mounting sheet(s) 50 provide a mounting surface for one or more two-dimensional and/or three-dimensional artistic elements that are to be part of an artistic construct. The artistic elements can be pre-fabricated and provided loosely for positioning/mounting by an artist, or can be factory-mounted without departing from the scope of the present invention. When lights 40 include UV black lights, the artistic elements can include fluorescent coloring/painting with fluorescent materials, paints, colors, etc., that react and become fluorescent when exposed to UV light. To enhance the black light effect, all of the inside wall surfaces of housing 12 present a matte black finish or surface using paint or wall coverings such as paper, fabric, etc. In an embodiment of the present invention, the inside wall surfaces of housing 12 can be covered with a loop fastener fabric/material (.e., VELCRO loop fastener material) to provide a mounting surface for attachable artistic elements as will be described later herein. The artistic elements can be arranged and applied to clear mounting sheet 50 collectively or individually. The artistic elements can be mounted in a permanent or removable fashion without departing from the present invention.

Figure 5:
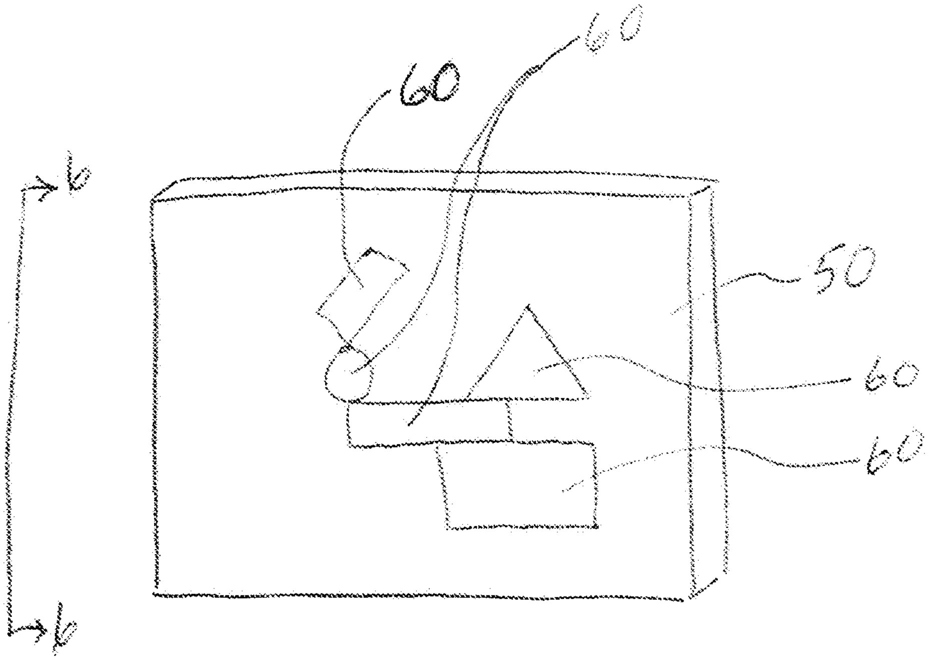
FIG. 5 is an isolated perspective view of the transparent mounting sheet with a number of geometric shapes applied to planar surface of the sheet in accordance with an embodiment of the present invention.
Figure 6:
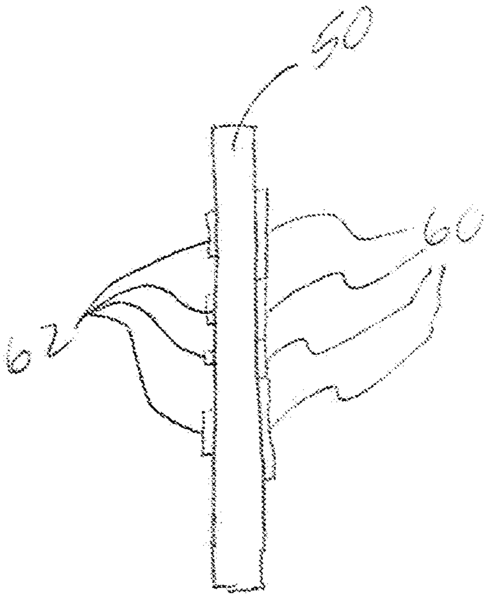
FIG. 6 is a side view of the transparent mounting sheet and geometric shapes taken along line 6-6 in FIG. 5 illustrating the use of magnetic materials to hold the shapes in place.

By way of an illustrative example shown in FIGS. 5 and 6, a number of metallic or magnetic geometric shapes 60 are positioned/arranged on one face of sheet 50, and then each shape 60 is held in place by a corresponding magnet 62 placed on the opposing face of sheet 50. Each of shape 60 and magnet 62 can also be realized by a magnetic metallic material. The various shapes or other artistic elements can be attached to sheet 50 temporarily using other devices/systems (e.g., suction cups, hook-and-loop fasteners, etc.) without departing from the scope of the present invention. The various shapes or other artistic elements can additionally or alternatively be attached to sheet 50 permanently using devices/systems such as glue, through-sheet fasteners (e.g., screws, bolts, etc.), etc., without departing from the scope of the present invention.

Once the one or more sheets 50 with their elements attached thereto are completed, the sheet (s) are placed in housing 12 and one or more lights 40 are activated. Viewing the resulting light-illuminated display provides a unique three-dimensional viewing effect. The visual effects can be enhanced if the viewer wears 3D glasses which could be made available to viewers or tethered to housing 12 without departing from the scope of the present invention.

Figure 7:
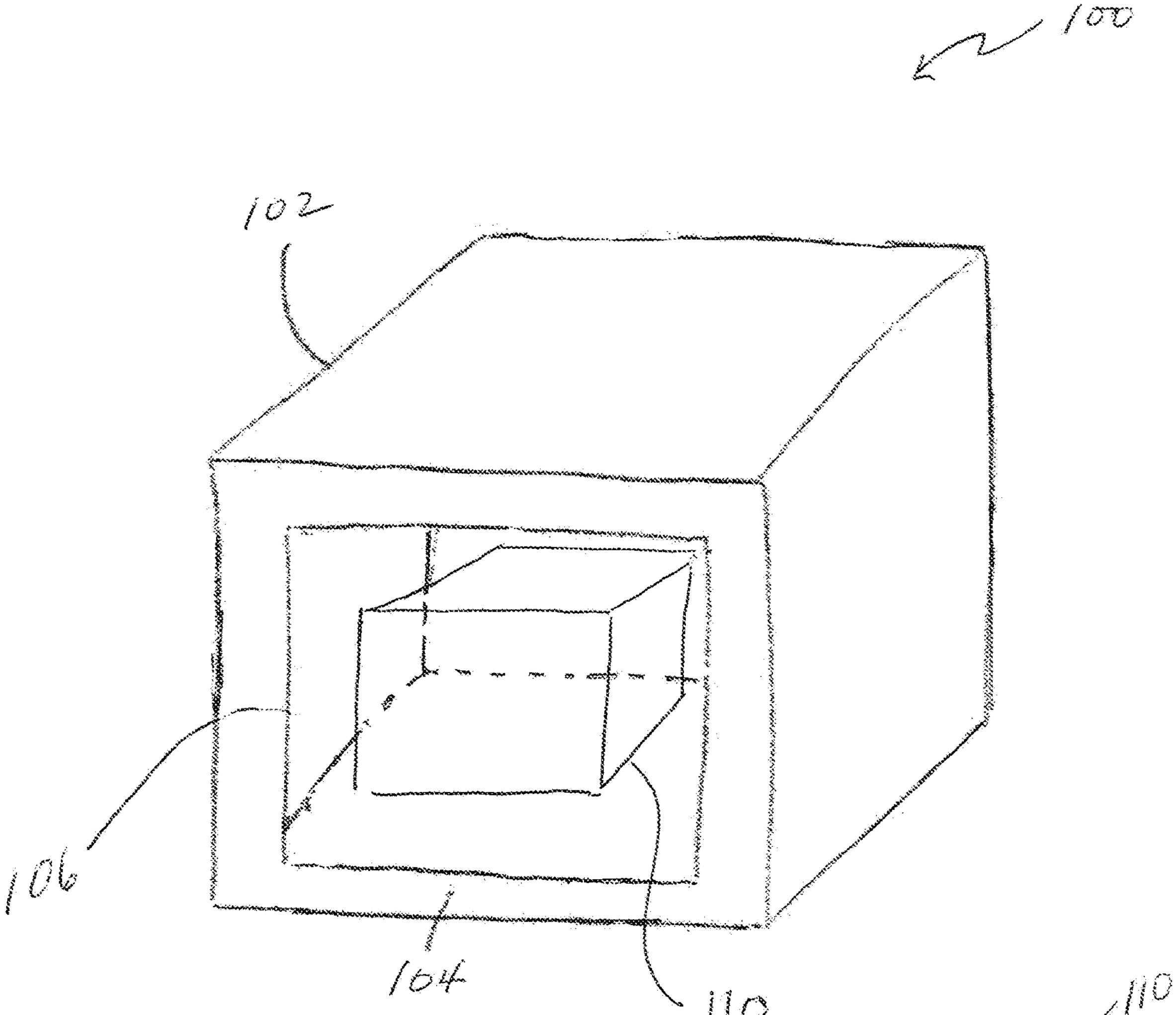
FIG. 7 is a perspective view of an internally-lit enclosure for the arranging and displaying of an artistic construct in accordance with another embodiment of the present invention.

Another embodiment of the present invention is illustrated in FIG. 7 where an internally-lit enclosure for arranging/displaying an artistic construct is shown and is referenced generally by numeral 100. Enclosure 100 includes an outer rigid housing 102 having features and attributes that are similar to those described above for housing 12. Briefly, the top, bottom, and three sides of housing 102 are opaque, and one side 104 of housing 102 includes a see-through opening 106 that is an unobstructed pass-through opening or an opening covered by a transparent window as previously described herein. Similar to enclosure 10, enclosure 100 will have one or more lights (not shown) mounted therein for illuminating the interior of housing 102 and items/elements mounted therein.

Rather than using sheets of transparent material to support artistic elements, enclosure 100 uses one or more three-dimensional transparent objects having a transparent wall structure to support the mounting of artistic elements. For example, positioned and supported within housing 102 is a transparent mounting cube 110 whose inside and/or outside faces serve as the mounting surfaces for two-dimensional and/or three-dimensional elements (not shown for clarity of illustration) that are to be part of an artistic construct. Similar to the elements in the previously-described embodiments (e.g., geometric shapes 60 shown in FIGS. 5 and 6), the elements can be pre-fabricated, can be colored/painted to be fluorescent, can be removably or permanently attached to cube 110, can be made from a variety of materials, etc., without departing from the scope of the present invention.

Figure 8A:
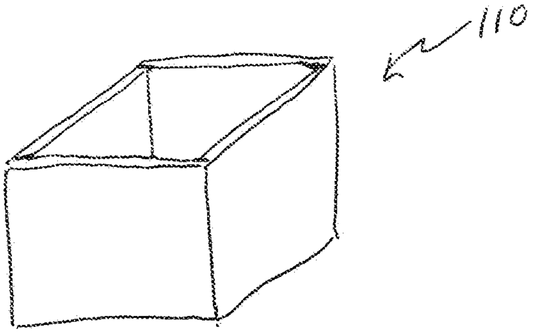
FIG. 8A is an isolated perspective view of an open-top transparent artistic-element mounting cube in accordance with an embodiment of the present invention.
Figure 8B:
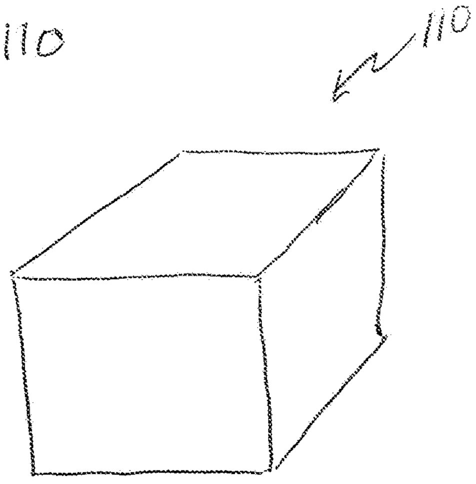
FIG. 8B is an isolated perspective view of a sealed-top transparent artistic-element mounting cube in accordance with another embodiment of the present invention.

Transparent mounting cube 110 can be made from any generally clear material (e.g., plastic, glass, etc.) so that all internal and external faces of cube 110 are viewable from open/transparent face 104 of housing 102. In this way, cube 110 presents a plurality of simultaneously viewable mounting surfaces for artistic elements thereby providing a unique three-dimensional visual experience for an observer. Mounting cube 110 can be a hollow, open-top (or open-bottom) cube to facilitate access to the inner surfaces thereof as illustrated in FIG. 8A. However, the present invention is not so limited as mounting cube 110 can also be a fully closed or sealed cube as illustrated in FIG. 8B. Still further, a mounting cube with no top or bottom could be used without departing from the scope of the present invention. The mounting cube could also be replaced with other geometric shapes (e.g., sphere, pyramid, regular or irregular polygonal shapes, egg-shape, etc.) without departing from the scope of the present invention. In other aspects of the present invention, multiple transparent mounting shapes (e.g., all the same shape, different shapes, all the same size, different sizes, etc.) could be provided within housing 102 without departing from the scope of the present invention.

Figure 9:
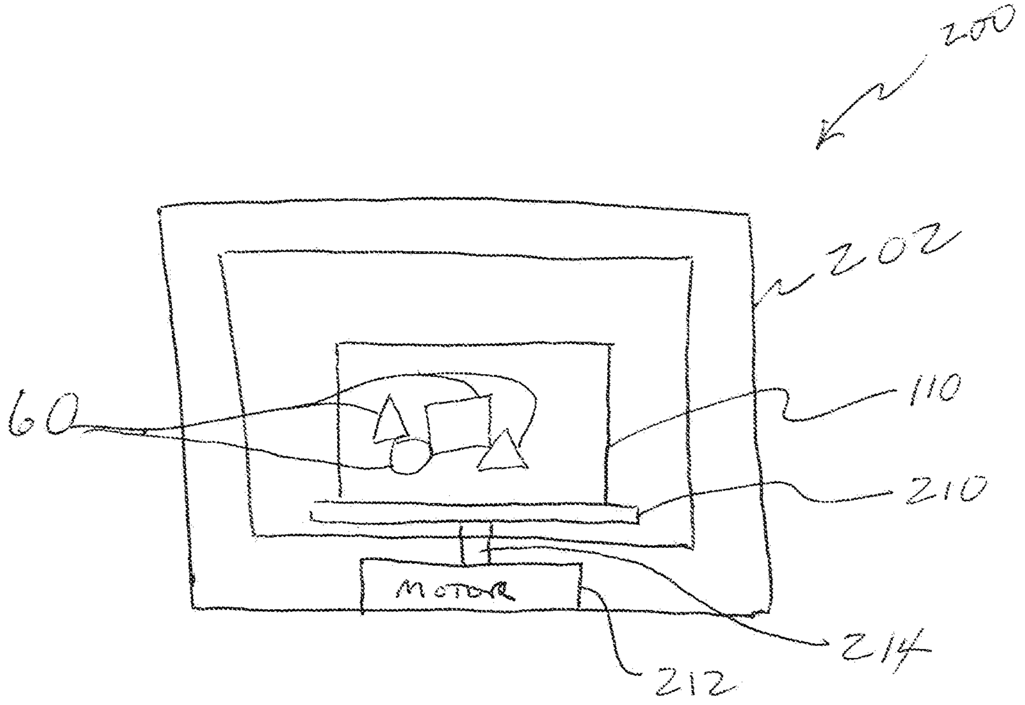
FIG. 9 is a front view of an enclosure equipped with a motorized turntable for the support and rotation of a transparent artistic-element mounting cube in accordance with another embodiment of the present invention.

The mounting sheet, cube, or other geometric shape can be stationary within its housing as shown and described in the embodiments presented thus far. However, the present invention is not so limited. For example, FIG. 9 illustrates another embodiment of an internally-lit enclosure for arranging and displaying an artistic construct referenced generally by numeral 200. Similar to the previously-described embodiment, enclosure 200 includes an outer rigid housing 202 having features and attributes that are similar to those described above for housings 12 and 102. A transparent mounting shape such as mounting cube 110 (having artistic elements 60 mounted thereon) is positioned and supported within housing 202. More specifically, mounting cube 110 is supported on a platform 210 that can be rotated in housing 202 by, for example, a motor 212 that rotates a drive shaft 214 coupled to platform 210. Drive shaft 214 could also be coupled directly to mounting cube 110 in which case a separate platform 210 could be omitted. Motor 212 can be mounted within housing 202 (as shown) or outside of housing 202 (e.g., underneath housing 202) in ways well understood in the art without departing from the scope of the present invention. Each face of cube 110 can display the same or different artistic elements without departing from the scope of the present invention.

Figure 10:
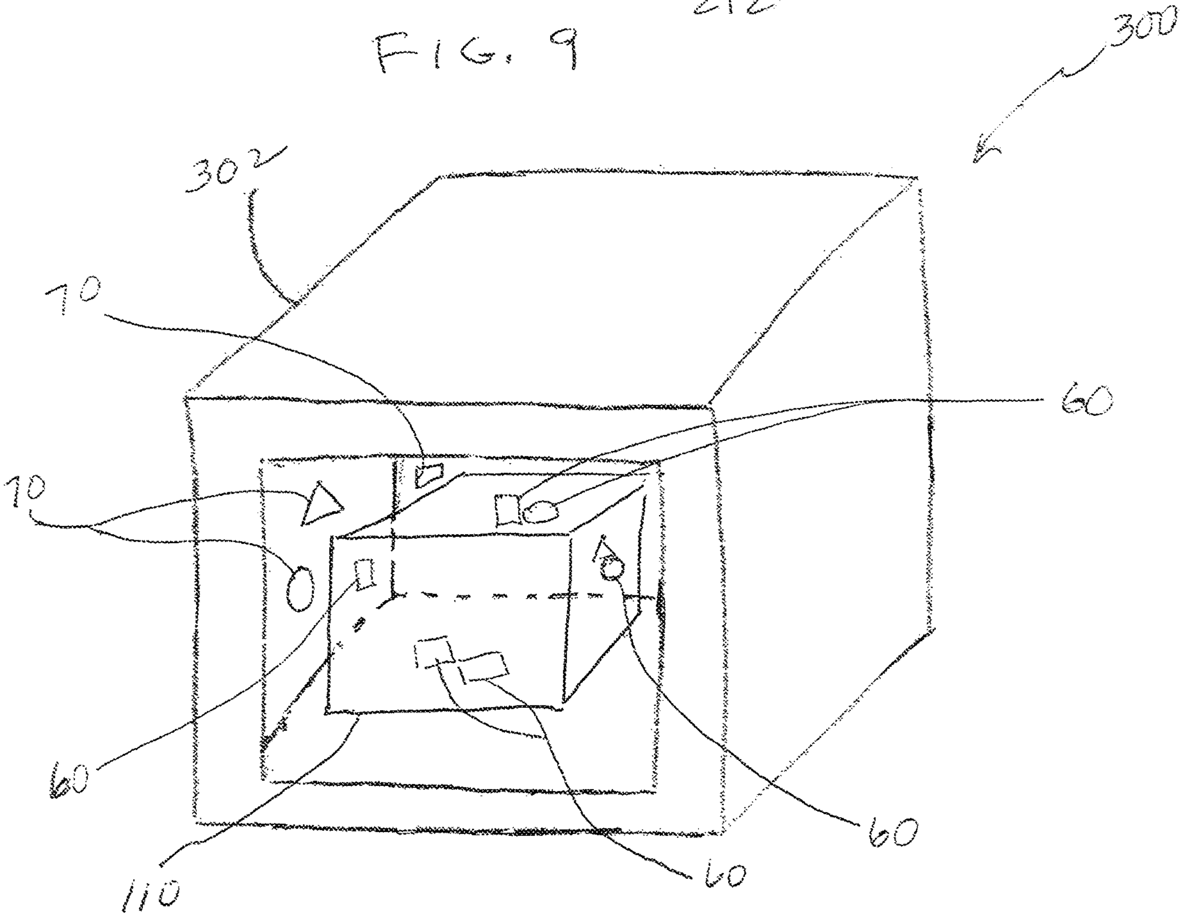
FIG. 10 is a perspective view of an internally-lit enclosure for the arranging and displaying of an artistic construct having inside wall surfaces that support the mounting of artistic elements in accordance with another embodiment of the present invention.

The mounting of artistic elements is not limited to placement on transparent mounting sheets/objects as in the previously-described embodiments. Accordingly and by way of example, FIG. 10 illustrates another embodiment of an internally-lit enclosure for arranging and displaying an artistic construct referenced generally by numeral 300. Similar to the previously-described embodiments, enclosure 300 includes an outer rigid housing 302 and a transparent mounting shape (e.g., mounting cube 110) positioned in housing 302. As also described above, artistic elements 60 are mounted on the various faces of cube 110. In addition, artistic elements 70 are mounted on the inside surfaces of housing 302. For example, if the inside surfaces of housing 302 are metal, elements 70 could be magnetic. Another option is for the inside surfaces of housing 302 and elements 70 to engage one another via well-known hook-and-loop fastener technology. Still further, elements 70 can be permanently affixed to the inside surfaces of housing 302. The inside surfaces of housing 302 can be painted/covered to present a matte black surface or finish to thereby enhance the visual effects provided by elements 70 when illuminated by UV black lighting within housing 302.

Figure 11:
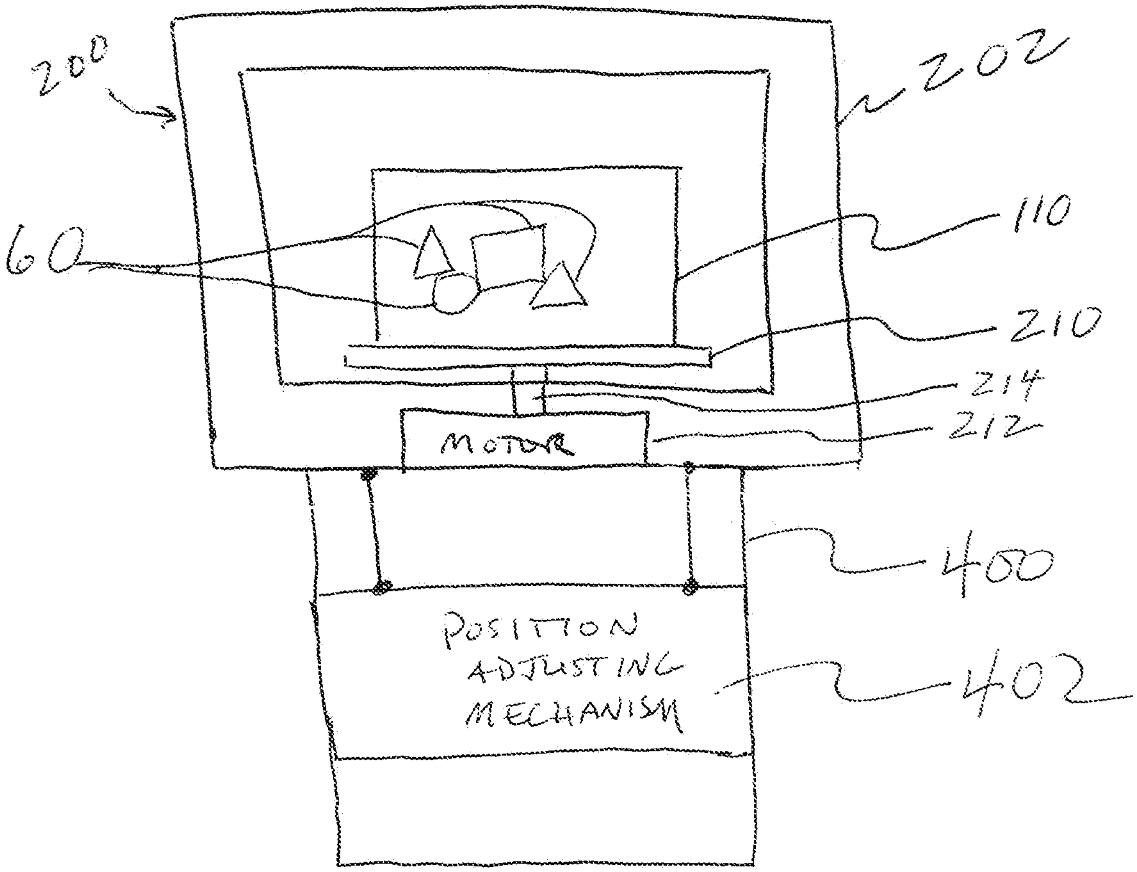
FIG. 11 is a front view of an enclosure and a support base equipped with a position adjusting mechanism to adjust the position of the enclosure in accordance with another embodiment of the present invention.

FIG. 11 illustrates another embodiment of the present invention in which a support base 400 on which any of the above-described enclosures could be mounted such as enclosure 200 in the illustrated example. Incorporated in base 400 is a position adjusting mechanism 402 coupled to enclosure 200 for manipulating (e.g., raising, lowering, spinning, tilting, etc.) enclosure 200 into a desired position or continuous motion for a particular display application. Additionally or alternatively, a speaker (e.g., wirelessly operated, hardwired, etc.) can be provided on or in the system's enclosure thereby allowing an artist to combine/synchronize an audio presentation with the visual presentation. Additional two-dimensional and/or three-dimensional elements could be supported/suspended from the enclosure's back panel using, for example, mounting brackets, rods, etc., to give the illusion that the elements are in suspension at the back region of the construct.

Figure 12:
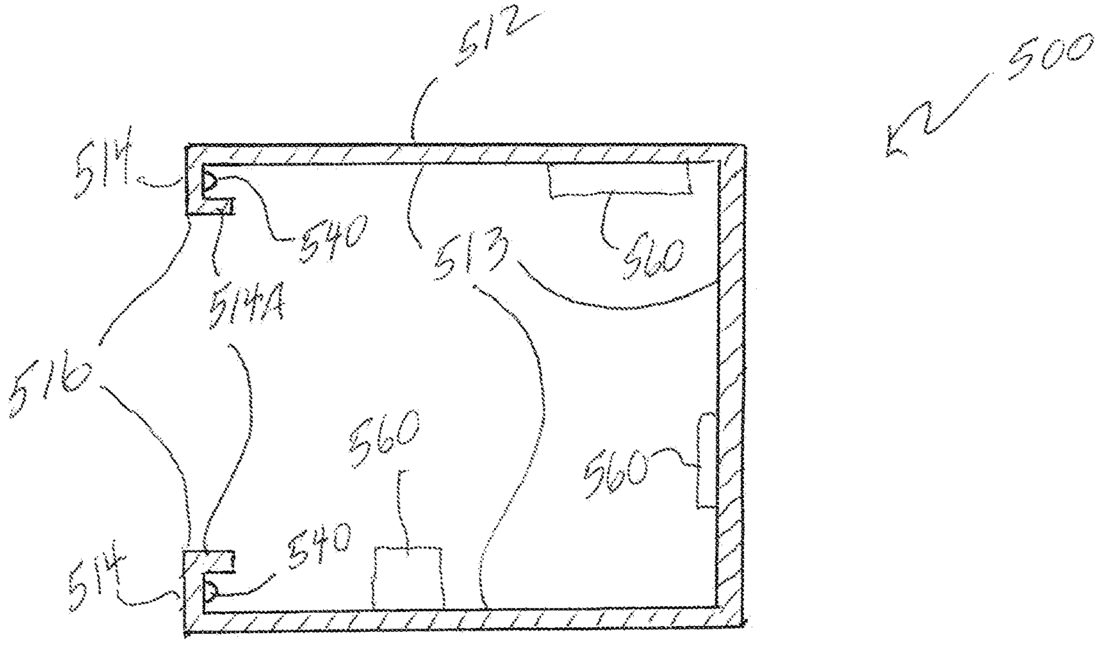
FIG. 12 is a cross-sectional view of an internally-lit enclosure for the arranging and displaying of an artistic construct in accordance with another embodiment of the present invention.

Another embodiment of the present invention is illustrated in FIG. 12 where a cross-sectional view of an internally-lit enclosure for the arrangement and display of an artistic construct is shown and is referenced generally by numeral 500. In accordance with this embodiment, all inside wall surfaces 513 of a hollow opaque housing 512 are covered, coated, etc., such that all inside wall surfaces present a matte black finish/surface. Similar to the previously-described embodiments, the front side 514 of housing 512 includes a see-through opening 516 that can be an unobstructed pass-through opening or can have a transparent sheet of material (not shown) disposed across opening 516. Still further, if housing 512 is large enough to permit entry by a user, opening 516 could subsequently be closed off to prevent ambient light from entering opening 516. That is, opening 516 could be closed off by a door, curtain, etc., so that a user can be completely immersed in the visual experience provided by and within enclosure 500 without being distracted by any ambient light.

Enclosure 500 also includes one or more UV lights (e.g., LEDs) 540 positioned in housing 512 at the inside surface of front side 514 and adjacent to opening 516. Front side 514 further includes an annular flange 514A at opening 516 that is attached to or integrated with front side 514. Annular flange 514A extends into housing 512 with lights 540 disposed between inside wall surface 513 and annular flange 514A. As a result, UV lights 540 can illuminate the inside of housing 512, but are not directly viewable by a viewer positioned outside of enclosure 500. In this way, when fluorescent elements 560 (placed on inside wall surfaces 513) are illuminated with UV light from UV lights 540, elements 560 appear to be floating in the three-dimensional space inside of housing 512. This enhanced visual sensation is created since a viewer cannot establish a visual "anchor" within housing 512 since UV lights 540 are not directly visible and since the matte black finish/surface of inside wall surfaces 513 does not reflect any of the UV light.

Figure 13:
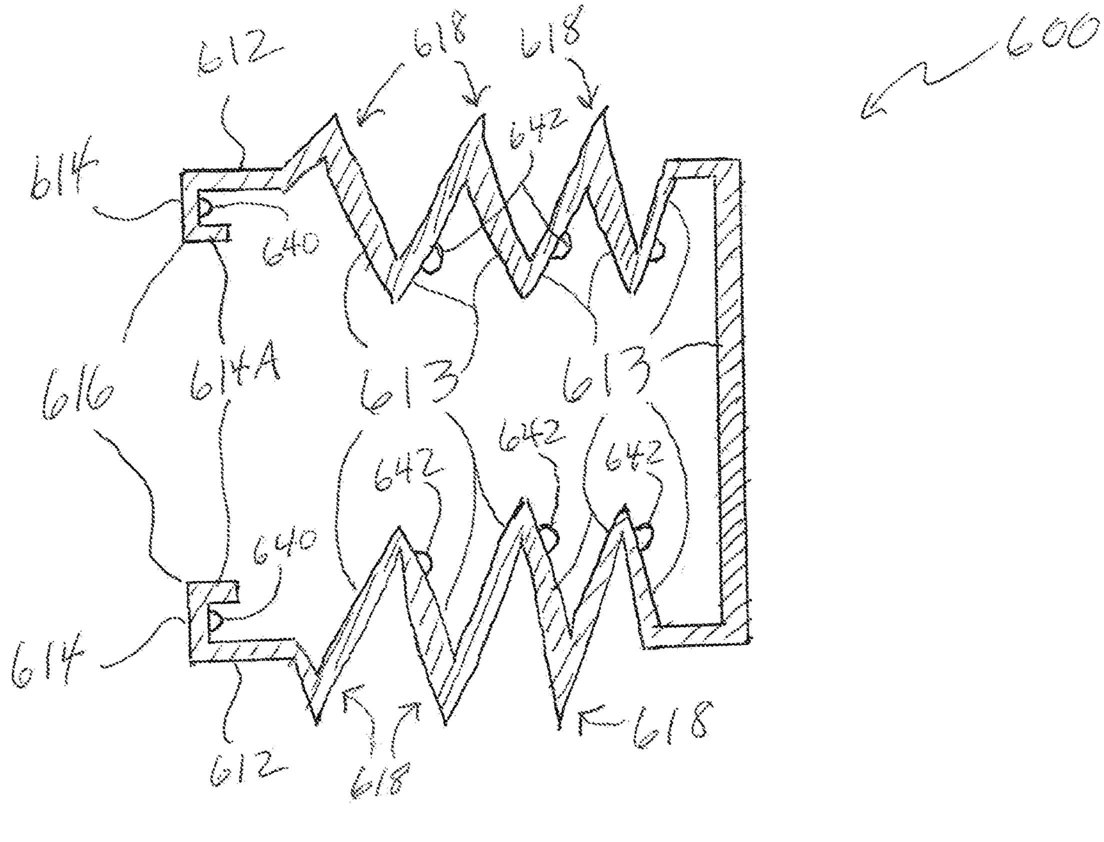
FIG. 13 is a cross-sectional view of an internally-lit expandable enclosure in its contracted state in accordance with another embodiment of the present invention.
Figure 14:
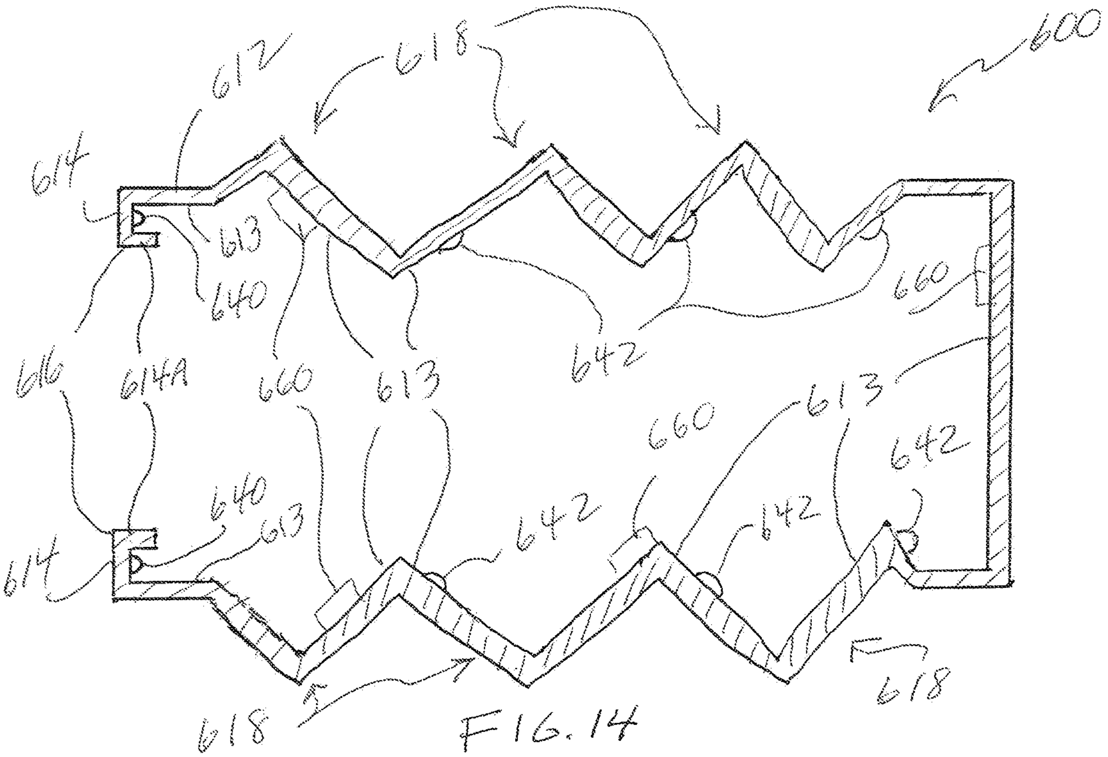
FIG. 14 is a cross-sectional view of the internally-lit expandable enclosure illustrated in FIG. 13 in its expanded state.

Still another embodiment of the present invention is illustrated in FIGS. 13 and 14 where a cross-sectional view of an internally-lit and expandable enclosure is shown and is referenced generally by numeral 600. FIG. 13 illustrates enclosure 600 in its contracted state, and FIG. 14 illustrates enclosure 600 in its expanded state. Similar to enclosure 500, all inside wall surfaces 613 of an expandable hollow opaque housing 612 are covered, coated, etc., to present a matte black finish/surface. Expandable housing 612 could be constructed with movable side walls that allow for the adjustment of the housing's dimensions to thereby provide for the expansion of housing 612. For example, the side walls could be made from accordion-like folds 618 (as shown), telescoping side wall sections, a series of movable and attachable side wall sections, etc. Accordingly, it is to be understood that the side walls of expandable housing 612 could be constructed for movement in a variety of ways that provide for housing expansion without departing form the scope of the present invention.

Similar to the previously-described embodiments, the front side 614 of housing 612 includes an opening 616 (e.g., an unobstructed pass-through, a transparent window, or closable by an opaque door/curtain if housing 612 is sized/configured for user entry). An annular flange 614A (analogous to annular flange 514A described above) can be provided to prevent an outside viewer from direct viewing of UV lights 640 positioned adjacent opening 616 and between inside wall surface 613 and annular flange 614A. Additional UV lights 642 can be placed along the expandable side wall portions of inside wall surface 613. Positioning of UV lights 642 is such that lights 642 are not directly viewable by a viewer looking into opening 616 from outside of housing 612. For example, if the expandable side walls of housing 612 are constructed from accordion-like folds 618 as shown, UV lights 642 can be positioned within folds 618 of the expandable side walls such that they will not be directly viewable through opening 616 when housing 612 is contracted (FIG. 13) or expanded (FIG. 14). Other expandable housing designs could employ appropriate direct-viewing blocking of UV lights 642. Fluorescent elements 660 can be placed where desired directly on inside wall surfaces 613.

Figure 15:
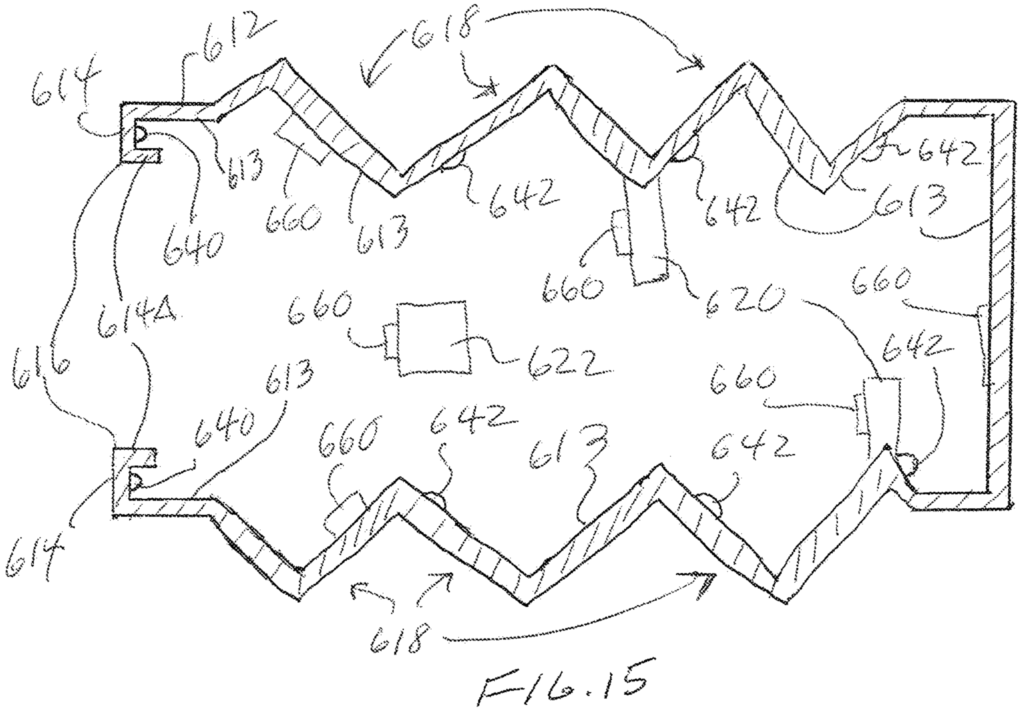
FIG. 15 is a cross-sectional view of an internally-lit expandable enclosure in its expanded state with additional mounting surfaces and structures provided therein in accordance with another embodiment of the present invention.

As shown in the embodiment illustrated in FIG. 15, additional mounting walls 620 could be coupled to inside wall surfaces 613 and/or free-standing mounting structures 622 could be placed within housing 612. Each of walls 620 and structures 622 present a matte black finish/surface on which additional fluorescent elements 660 can be placed. Mounting walls 620 could also be utilized to prevent one from viewing fluorescent elements 660 from the housing's opening 616.

Figure 16:
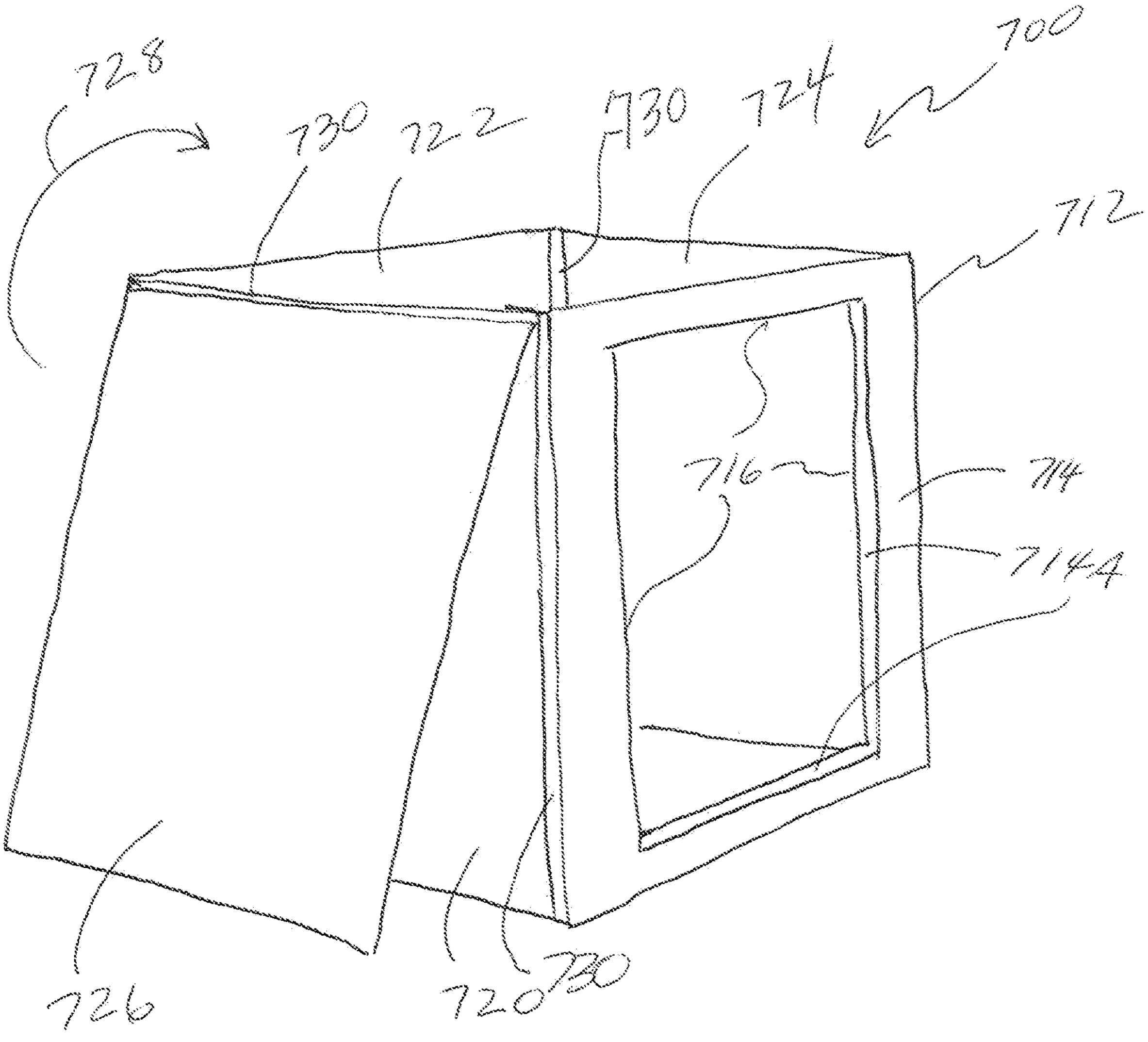
FIG. 16 is a perspective view of an internally-lit expandable enclosure with its movable walls positioned to provide an expanded housing in accordance with another embodiment of the present invention.

As mentioned above, an expandable housing could also be constructed using other types of movable side walls as illustrated in FIG. 16 where a perspective view of another expandable enclosure is shown and is referenced generally by numeral 700. Enclosure 700 is illustrated with its housing 712 in its expanded state. Housing 712 includes side walls 720, 722 and 724, and includes a ceiling 726. More specifically, side wall 720 is hingedly coupled to one side edge of front side 714 of housing 712, side wall 722 is hingedly coupled to the side edges of side walls 720 and 724, and side wall 724 is attachable to the other side edge of front side 714. Ceiling 726 can be, for example, hingedly coupled to a top edge of side wall 720 such that ceiling 726 can be pivoted over the top of housing 712 (as indicated by arrow 728) when the side walls are extended as shown. Hinging of the side walls and ceiling can be provided by continuous hinges 730 (as shown) or a number of discrete hinges, and can be made of cloth, metal, etc., without departing from the scope of the present invention. The ceiling could also be a foldable accordion-like structure, or a rolled-shade type of structure without departing from the scope of the present invention. Similar to the previously-described embodiments, the front side 714 of housing 712 includes an opening 716, which can be closed off by a door, curtain, etc., if enclosure 700 is sized for entry by a user. The inside wall and ceiling surfaces of housing 712 present a matte black finish/surface to the interior region of housing 712. UV lights (not shown) are placed within housing 712 in accordance with the placement constraints previously described herein, e.g., behind an annular flange 714A at opening 716.

The advantages of the present invention are numerous. The unique artistic construct display system provides an amateur or professional artist with a base canvas on which to construct a three-dimensional work. UV illumination of fluorescent elements placed in a housing whose inside wall surfaces present a matte black finish surface highlights the elements to provide a three-dimensional artistic construct. By also preventing a viewer from any direct viewing of the UV lights, a three-dimensional floating effect is created for all the elements. The construct's housing can be expandable to increase the possible effects.

Although the invention has been described relative to specific embodiments thereof, there are numerous variations and modifications that will be readily apparent to those skilled in the art in light of the above teachings. For example, one or more of an enclosure's inside wall surfaces could present colors other than matte black in order to alter a user's 3D depth perception. Further, one or more of the inside wall surfaces and the artistic elements could be selected to support quick design changes, e.g., metal walls supporting magnetic artistic elements to thereby allow the artistic elements to be easily slid to new positions. It is therefore to be understood that, within the scope of the appended claims, the invention may be practiced other than as specifically described.

What is claimed as new and desired to be secured by Letters Patent of the United States is:

1. An artistic construct display system, comprising:

an opaque housing having an opening, said housing having matte black inside wall surfaces;

at least one fluorescent element mounted on said matte black inside wall surfaces;

at least one ultraviolet (UV) light mounted in said housing adjacent to said opening; and an annular flange coupled to said housing at said opening thereof, said annular flange extending into said housing wherein each said UV light is disposed between said annular flange and said matte black inside wall surfaces for illuminating inside regions of said housing, said annular flange preventing each said UV light from being directly viewable from outside of said housing.

2. An artistic construct display system as in claim 1, wherein said housing includes expandable side walls for adjusting dimensions of said housing, and further comprising additional UV lights coupled to said expandable side walls wherein portions of said expandable side walls prevent said additional UV lights from being directly viewable through said opening of said housing.

3. An artistic construct display system as in claim 1, wherein said matte black inside wall surfaces comprise painted surfaces.

4. An artistic construct display system as in claim 1, wherein said matte black inside wall surfaces comprise a covering material selected from the group consisting of paper, fabric, and loop fastener material.

5. An artistic construct display system, comprising:

an opaque housing having an opening and having expandable side walls, said housing having matte black inside wall surfaces;

at least one fluorescent element mounted on said matte black inside wall surfaces;

a first plurality of ultraviolet (UV) lights mounted in said housing adjacent to said opening, an annular flange coupled to said housing at said opening thereof, said annular flange extending into said housing wherein each of said first plurality of UV lights is disposed between said annular flange and said matte black inside wall surfaces for illuminating inside regions of said housing, said annular flange preventing each said of said first plurality of UV lights from being directly viewable from outside of said housing; and a second plurality of UV lights coupled to said expandable side walls wherein portions of said expandable side walls prevent each of said second plurality of UV lights from being directly viewable through said opening of said housing.

6. An artistic construct display system as in claim 5, wherein said matte black inside wall surfaces comprise painted surfaces.

7. An artistic construct display system as in claim 5, wherein said matte black inside wall surfaces comprise a covering material selected from the group consisting of paper, fabric, and loop fastener material.

* * * * *